(12) United States Patent
Cheung et al.

(10) Patent No.: US 9,809,001 B2
(45) Date of Patent: Nov. 7, 2017

(54) FLEXURAL DIGITAL MATERIAL CONSTRUCTION AND TRANSDUCTION

(71) Applicants: Kenneth C. Cheung, Boston, MA (US); Samuel Eli Calisch, Crawfordsville, IN (US); Neil A. Gershenfeld, Cambridge, MA (US)

(72) Inventors: Kenneth C. Cheung, Boston, MA (US); Samuel Eli Calisch, Crawfordsville, IN (US); Neil A. Gershenfeld, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/201,781

(22) Filed: Mar. 7, 2014

(65) Prior Publication Data

US 2014/0302261 A1    Oct. 9, 2014

Related U.S. Application Data

(63) Continuation-in-part of application No. 13/961,880, filed on Aug. 7, 2013, now Pat. No. 9,566,758, which
(Continued)

(51) Int. Cl.
*B32B 3/06* (2006.01)
*E04C 1/00* (2006.01)
(Continued)

(52) U.S. Cl.
CPC ............... *B32B 3/06* (2013.01); *B25J 9/0015* (2013.01); *B64C 1/06* (2013.01); *B64C 3/48* (2013.01); *E04C 1/00* (2013.01); *B64C 2003/445* (2013.01)

(58) Field of Classification Search
CPC ..... B32B 3/06; B23P 11/00; Y10T 428/24008
(Continued)

(56) References Cited

U.S. PATENT DOCUMENTS 2,314,949 A    3/1943    Palmer
2,380,336 A    7/1945    Schwebel
(Continued)

FOREIGN PATENT DOCUMENTS

DE    202009000527 U1    3/2009

OTHER PUBLICATIONS

Lego Basic Blue Bucket Set 7615 Instructions, 2009.
(Continued)

*Primary Examiner* — Brent O'Hern
(74) *Attorney, Agent, or Firm* — Norma E. Henderson

(57) ABSTRACT

Flexural digital materials are discrete parts that can be assembled into a lattice structure to produce an actuatable structure capable of coordinated reversible spatially-distributed deformation. The structure comprises a set of discrete flexural digital material units assembled according to a lattice geometry, with a majority of the discrete units being connected, or adapted to be connected, to at least two other units according to the geometry. In response to certain types of loading of the structure, a coordinated reversible spatially-distributed deformation of at least part of the structure occurs. The deformation of the structure is due to the shape or material composition of the discrete units, the configuration of connections between the units, and/or the configuration of the lattice geometry. Exemplary types of such actuatable structures include airplane wing sections and robotic leg structures. An automated process may be employed for constructing an actuatable structure from flexural digital materials.

11 Claims, 10 Drawing Sheets

Related U.S. Application Data is a continuation-in-part of application No. 13/924,530, filed on Jun. 21, 2013, now Pat. No. 9,690,286, and a continuation-in-part of application No. 13/277,103, filed on Oct. 19, 2011, now Pat. No. 8,986,809.

(60) Provisional application No. 61/680,275, filed on Aug. 7, 2012, provisional application No. 61/394,713, filed on Oct. 19, 2010, provisional application No. 61/662,358, filed on Jun. 21, 2012, provisional application No. 61/774,178, filed on Mar. 7, 2013.

(51) Int. Cl.
  *B64C 1/06* (2006.01)
  *B64C 3/48* (2006.01)
  *B25J 9/00* (2006.01)
  *B64C 3/44* (2006.01)

(58) Field of Classification Search
  USPC ..................................................... 428/99, 98
  See application file for complete search history.

(56) References Cited

U.S. PATENT DOCUMENTS

| | | | |
|---|---|---|---|
| 3,005,282 A | 10/1961 | Christiansen | |
| 3,157,582 A | 11/1964 | Bobule | |
| 3,339,911 A | 9/1967 | Strom | |
| 3,836,099 A | 9/1974 | O'Neill | |
| 4,009,543 A | 3/1977 | Smrt | |
| 4,247,066 A | 1/1981 | Frost | |
| 4,593,514 A | 6/1986 | Smith | |
| 4,780,643 A | 10/1988 | Ellis | |
| 5,378,185 A | 1/1995 | Ban | |
| 5,398,472 A | 3/1995 | Eichelkraut | |
| 5,453,034 A | 9/1995 | Larws | |
| 6,056,613 A | 5/2000 | Pike | |
| 6,336,269 B1 | 1/2002 | Eldridge | |
| 6,407,738 B1 | 6/2002 | Wakabayashi | |
| 7,007,370 B2 | 3/2006 | Gracias | |
| 7,162,324 B2 | 1/2007 | Silverbrook | |
| 7,625,261 B2 | 12/2009 | Andersen | |
| 2003/0146346 A1* | 8/2003 | Chapman, Jr. | B29C 66/721 244/123.3 |
| 2006/0046604 A1 | 3/2006 | Scarborough | |
| 2008/0220112 A1 | 9/2008 | Waldrop | |
| 2009/0030501 A1 | 1/2009 | Morris | |
| 2010/0007223 A1 | 1/2010 | Denne | |
| 2010/0018420 A1 | 1/2010 | Menard | |
| 2010/0197148 A1 | 8/2010 | Rudisill | |
| 2010/0260221 A1 | 10/2010 | Yu | |
| 2010/0292836 A1 | 11/2010 | Cheung | |
| 2011/0123794 A1 | 5/2011 | Hiller | |
| 2013/0189028 A1 | 7/2013 | Gershenfeld | |

OTHER PUBLICATIONS

Supplementary European search report, EP 11846817, international filing date Oct. 19, 2011, report dated Feb. 10, 2015.
International search report and written opinion of international searching authority, PCT/US2011/056961, international filing date Oct. 19, 2011, report dated May 21, 2012.
International search report and written opinion of international searching authority, PCT/US2013/047195, international filing date Jun. 21, 2013, report dated Nov. 1, 2013.
International search report and written opinion of international searching authority, PCT/US2013/054034, international filing date Aug. 7, 2013, report dated Apr. 15, 2014.
International search report and written opinion of international searching authority, PCT/US2013/056063, international filing date Aug. 21, 2013, report dated Apr. 28, 2014.
International search report and written opinion of international searching authority, PCT/US2014/022168, international filing date Mar. 7, 2014, report dated Nov. 28, 2014.

* cited by examiner

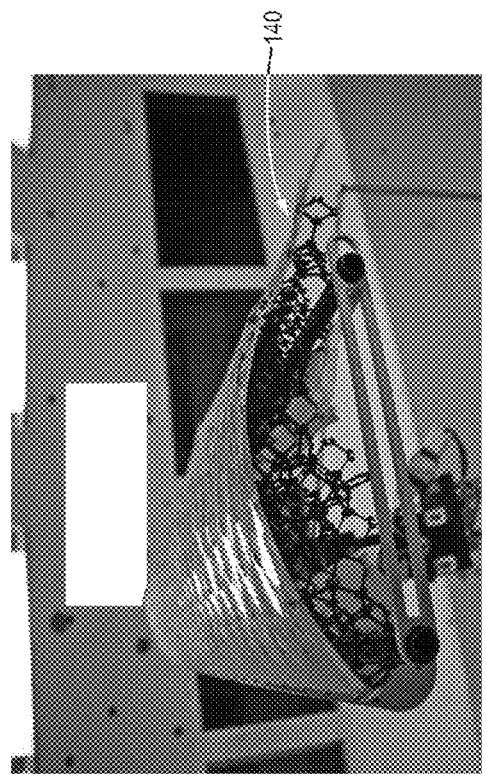
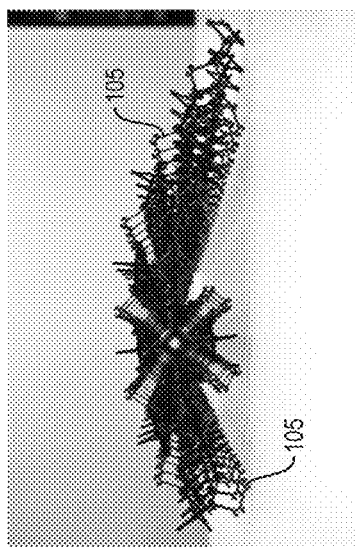
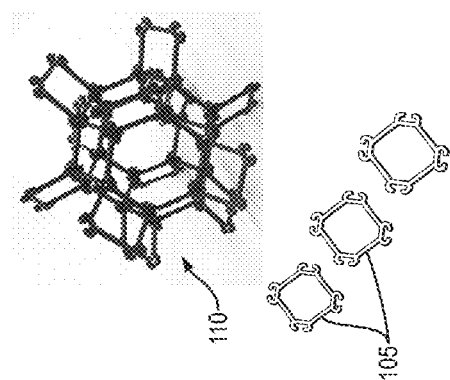
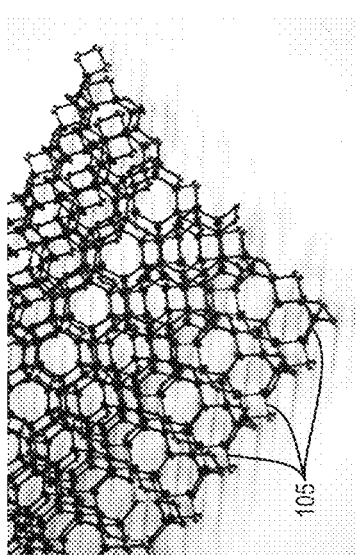
FIG. 1A
FIG. 1B
FIG. 1C
FIG. 1D

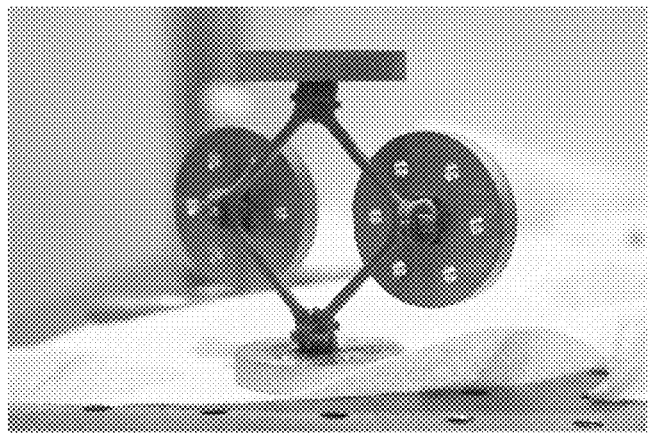
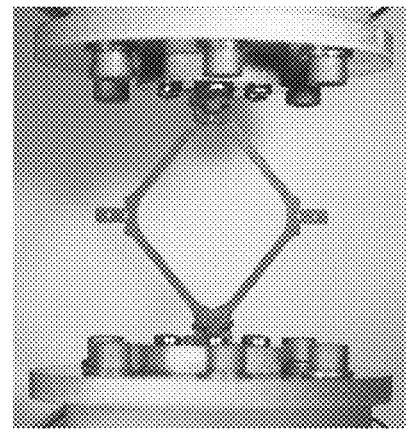
FIG.18A　　　　　　　FIG.18B
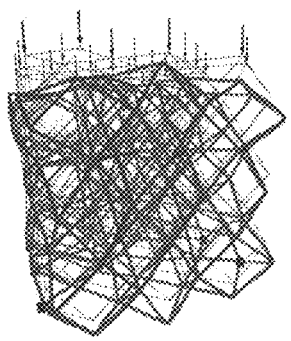
FIG.19
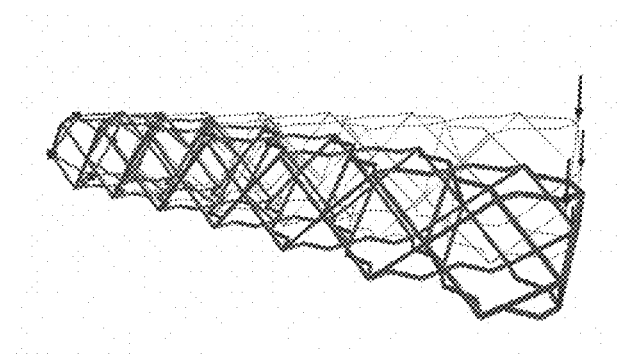
FIG.20

FLEXURAL DIGITAL MATERIAL CONSTRUCTION AND TRANSDUCTION

RELATED APPLICATIONS

This application claims the benefit of U.S. Provisional Application Ser. No. 61/774,178, filed Mar. 7, 2013, the entire disclosure of which is herein incorporated by reference.

This application is a continuation-in-part of U.S. patent application Ser. No. 13/961,880, filed Aug. 7, 2013, which claims the benefit of U.S. Provisional Application Ser. No. 61/680,275, filed Aug. 7, 2012, and which is a continuation-in-part of U.S. patent application Ser. No. 13/924,530, filed Jun. 21, 2013, now U.S. Pat. No. 9,690,286, issued Jun. 27, 2017, which claims the benefit of U.S. Provisional Application Ser. No. 61/662,358, filed Jun. 21, 2012, and is also a continuation-in-part of U.S. patent application Ser. No. 13/277,103, filed Oct. 19, 2011, now U.S. Pat. No. 8,986,809, issued Mar. 24, 2015, which claims the benefit of U.S. Provisional Application Ser. No. 61/394,713, filed Oct. 19, 2010, the entire disclosures of which are all herein incorporated by reference.

STATEMENT REGARDING FEDERALLY SPONSORED RESEARCH OR DEVELOPMENT

This invention was made with U.S. government support under Contract No. W911NF-11-1-0096, awarded by the Army Research Office, and under Contract No. HR0011-12-1-0003, awarded by the Defense Advanced Research Projects Agency. The Government has certain rights in this invention.

FIELD OF THE TECHNOLOGY

The present invention relates to digital materials and, in particular, to construction using flexural digital materials.

BACKGROUND

Continuously shape-morphing structures have previously mostly focused on traditional kinematics with flexural components that match or exceed the deformation length scales, and/or rely on high density and high cost materials such as piezoelectric ceramics, shape memory alloys, and electro-active polymers. This has limited the size, degrees of freedom, and manufacturability of shape-morphing structures to date.

Conventionally designed and engineered fabrication methods employ digital computation and communication algorithms to control analog mechanical equipment that additively or subtractively forms shapes from masses of bulk material. Digital material systems instead propose a method for fabrication from discrete parts with discrete relative local positioning, instead of continuous variation of composition and location of material, as in an analog fabrication system. This may be thought of as printing, noting that an important distinction between digital material printing and conventional commercially available three dimensional printing processes is that digital material printing is reversible, and the information regarding the shape, assembly, and function of a finished product is intrinsic to the material that it is composed of.

Structure design and construction requires consideration of multiple factors. The design and fabrication process will generally include considerations of: 1) design requirements, 2) likely failure modes, 3) stress analysis for failure modes identified, 4) material selection and behavior, 5) fabrication, and 6) testing, all within the context of the overall design goals. For example, in order to achieve reduction in weight, increase in strength, and reduction in cost, the engineering design, materials of construction, and methods of fabrication must all be considered. In general, modern fabrication techniques include various additive and subtractive processes, employing a range of materials, including, but not limited to, composite materials, cellular materials, and digital materials.

"Composite materials" describes any two or more materials that are combined together in a single bulk material to obtain the best properties from both materials. Many industries are shifting towards the use of more composite materials because they display the single most significant consideration for any application: low weight compared to strength. The material properties of composites are unlike any material thus far, because they combine the properties of a high modulus and high tensile strength fiber for flexibility and strength, with a low modulus stiff matrix which transfers forces from one fiber to the next, creating essentially a continuous analog bulk material. Fiber-reinforced composite materials have thus enabled construction of structures having large reductions in weight for given strength and stiffness targets, but this reduction comes at the cost of very high design and processing costs and many challenges in producing mechanical interfaces (joints).

Composites are still problematic as the material of choice hindering widespread use for many reasons. First, composites vary in fibers, resins, and weaves from one manufacturer to the next, with strength and weight dependent on layup and direction of weave. Second, composites require an energy intensive process. Highly skilled technicians are never really able to have complete control over the application of pressure and heat to allow for proper curing and even distribution of heat over the entire surface [Dorworth, C. Louis, Gardiner L. Ginger, Mellema M. Greg, "Essentials of Advanced Composite Fabrication and Repair", 2010]. Third, any flaw detected in a composite skin renders the entire material a complete waste, or makes repair difficult since creating the exact conditions to maintain bond strength is close to impossible to achieve. Fourth, not only is the composite surface designed, but the tooling and moulding for the composite is just as intensive as the final part. In the process of mitigating stress concentration, composite skins are ultimately labor intensive, time intensive, and expensive.

"Cellular materials" or "cellular solids" refers to the material structure of any living or nonliving matter, typically described as anisotropic and unidirectional or isotropic and having the same properties in all directions. Cellular materials can fill space in two-dimensions as extruded honeycomb or prismatic cells or three-dimensions as space filling polyhedra in various lattice formations. Cellular materials have been mimicked in engineered foam core structures used in construction, aerospace, and medical industries. These man made materials can be designed as highly porous scaffolds or fully dense structures which can be mechanically tuneable for a specific performance. While the science of cellular solids has enabled widespread use of lightweight materials to meet many important engineering needs, such as passive energy absorption, cellular solids are not presently in widespread use for structural applications, perhaps due to a large gap between the strength and stiffness to weight ratios of popular classical solids and the performance of known lightweight cellular materials produced from the same constituent material.

The science of cellular solids has enabled the widespread use of lightweight materials to meet important engineering needs, such as passive energy absorption, but they are not in widespread use for structural applications, perhaps due to a large gap between the strength and stiffness to weight ratios of popular classical solids, and the performance of known lightweight cellular materials that are produced from the same constituent material. The engineering of fiber reinforced composite materials has enabled structures with large reductions in weight for given strength and stiffness targets, but at very high design and processing costs, and many challenges in producing mechanical interfaces (joints).

The advances of material science in engineering of cellular solids, such as honeycomb core materials and foams, have resulted in the ability to design with lighter, more elastic, more insulating, and more energy absorptive materials. The practice of treating cellular solids as conventional continuous solids allows for simple application with conventional engineering and design methods. In the context of cellular materials, it has been noted that "constructed" periodic metal lattices allow for much larger cell size, and therefore lower relative density, compared to other methods of producing cellular metals [Wadley, H., "Cellular Metals Manufacturing", Advanced Engineering Materials, vol. 4, no. 10, pp. 726-733, 2002].

Digital materials are comprised of a small number of types of discrete physical building blocks, which assemble to form constructions that meet the versatility and scalability of digital computation and communication systems. Digital materials have specifically been defined in prior work by Popescu as having three main properties at the highest level of description: a finite set of components or discrete parts, a finite set of discretized joints of all components in a digital material, and complete control of assembly and placement of discrete interlocking components [Popescu, G., Gershenfeld, N. and Marhale, T., "Digital Materials For Digital Printing", International Conference on Digital Fabrication Technologies, Denver, Colo., September 2006]. Digital materials promise scalable methods of producing functional things with reconfigurable sets of discrete and compatible parts.

Digital Cellular Solids are cellular solids that exhibit improvements in relative stiffness and strength compared to relative density, over current practices for producing lightweight materials. This is accomplished by assembling lattice geometries that perform better than any currently made with traditional methods. When implemented with fiber composites, the result is not only stiffer and stronger than any previously known ultra-light material, but it presents a new scalable and flexible workflow for applying fiber composites to engineering problems.

Digital composites allow for rapid prototyping of fiber composite parts with high throughput robotic digital assemblers. The individual components may be produced through conventional means, as suited for mass production of identical parts. With digital assembly of sparse volumes composed of many smaller components, all of the tooling required may be significantly smaller than the finished assemblies. The possible properties of digital materials are myriad, and they can be designed out of any material using existing fabrication technologies and tools in order to build cellular structures for any application. Digital materials, as compared to analog materials, are completely reversible, eliminating waste by allowing individual parts to be reused and recycled at any point in the product lifecycle, no matter how large the assembly.

Architecture and civil engineering have employed space frame truss structures for many years. These have not previously been scaled volumetrically, as a perfect lattice, to the orders of units that make it practical to consider the bulk assemblies as a continuum, as would be beneficial for engineering and design purposes. Further, it is well known that space frames with many elements sharing structural duty possess highly desirable characteristics in terms of failure modes and damage tolerance [Lakes, R., "Materials with structural hierarchy", Nature, vol. 361, pp. 511-515, 1993; Huybrechts, S., & Tsai, S. W., "Analysis and Behavior of Grid Structures", Composites Science and Technology, vol. 56, pp. 1001-1015, 1996]. This is evident in "geodetic" airframe designs [Paul, D., Kelly, L., Venkaya, V., & Hess, T., "Evolution of U.S. Military Aircraft Structures Technology", Journal of Aircraft, vol. 39, no. 1, pp. 18-29, 2002]. The current state of robotic manufacturing technology makes it easy to see how massively parallel assembly of digital materials can be implemented, including the assembly of structures that are larger than the assembly machinery.

The commercial aerospace industry has been moving towards aircraft designs that have fewer but larger monolithic fiber composite parts, in order to produce highly tuned and lightweight structural systems that meet extreme service, monitoring, and general environmental requirements. Conventional wisdom is that larger monolithic parts are better than an assembly of smaller parts because producing effective joints between parts is highly problematic in practice. Conventional manufacturing processes have scaled up, accordingly, which requires tools (e.g., molds for defining the shape of the part), and ovens (e.g., autoclaves for polymer matrix curing) that are large enough to influence the size of the buildings that must contain them. Some may consider that the expense involved with these manufacturing methods limits the industry altogether; there is no question that it limits prototyping capabilities. Further, the per-part investment is high enough to warrant complex repair processes as defects of small relative size arise, to say nothing of their contribution to resource intensive qualification procedures [U.S. Department of Defense, Composite Materials Handbook, "Polymer Matrix Composites Guidelines for Characterization of Structural Materials", MIL-HDBK-17-1F 1, 2002].

Leung [Leung, A. C. H., "Actuation of kagome lattice structures", American Institute of Aeronautics and Astronautics, April 2004] showed that the Kagome lattice structure is a desirable starting point for lattice based active structures in two dimensions. Unfortunately, there was little time given to manufacturing considerations or material properties. Hutchinson [Hutchinson, R. G., N. Wicks, A. G. Evans, N. A. Fleck, J. W. Hutchinson, "Kagome plate structures for actuation", International Journal of Solids and Structures, 2003, vol. 40, pp. 6969-6980] continues this line of inquiry, using double-layer Kagome lattices. Theoretical bounds on performance are derived, but similarly little consideration is given to fabrication, save one mention of a transient liquid phase bonding process. Both of these approaches are bound to plate-like structures, as opposed to the space-filling lattices of this approach.

Donev [Donev, Aleksandar, Salvatore Torquato, "Energy-efficient actuation in infinite lattice structures", Journal of Mechanics and Physics of Solids, 2003, vol. 51, pp. 1459-1475] takes a more general stance, showing that it is possible to design lattice structures that reach any uniform stress state in two or three dimensions by actuating a set of bars in coordination while doing zero work. This bar actuation paradigm is characteristic of all known lattice actuation literature (including those of the previous paragraph), which differs from the global actuation framework presented here. Despite this difference, the results are very exciting. If the actuated bars are replaced with flexural degrees of freedom, any uniform strain can be achieved at only the small energy cost of deforming the flexural elements.

SUMMARY

Bulk digital composites lie in a regime of density and stiffness far outside the parameter space of conventional materials. Such digital composites are used in deformable, actuatable structures that combine these desirable material properties with a specified deformation. These actuators exhibit spatially distributed deformation, with drive mass separated from moving regions, and are capable of exotic, programmable movements. These digital material actuators are controlled globally, usually with an internally routed tendon. Like an animal muscle, opposing pairs of these tendons give stiffness to the structure when stressed equally. When differentially stressed, they produce the prescribed deformation. Spatially distributed actuation without discontinuities holds particular promise for the design of efficient aerodynamic control surfaces. For high-speed applications, this class of actuators has drastically lower moving mass than conventional approaches in robotics, enabling much higher slew rates. Finally, while the range of programmable deformations scales exponentially with lattice size, the manufacturing complexity scales only linearly or sublinearly through the automation made possible by the small part set.

In one aspect, the invention is an actuatable structure comprising a set of discrete units, the set of discrete units being assembled into the structure according to a lattice geometry, wherein a majority of the discrete units are each connected, or adapted to be connected, to at least two other units in the set according to the lattice geometry, and wherein, in response to at least one type of loading of the structure, a coordinated reversible spatially-distributed deformation of at least part of the structure occurs. The coordinated reversible spatially-distributed deformation of at least part of the structure is due at least in part to the shape of the units in the set, the material composition of the units in the set, the configuration of connections between the units of the set, and/or the configuration of the lattice geometry. The connections may be elastic. The units in the set of discrete units may be identical or of more than one type, and some of the types may be connector units. When there is more than one type of unit, different types of units may differ in material composition or property from other types of units. Some of the discrete units may be connected to others of the discrete units by connections that are adapted to transfer force between connected units. The structure may have step-function flexures configured to protect the integrity of the lattice.

In one aspect of the invention, the actuatable structure may be a digital material wing and the structure has sufficient flexural degrees of freedom to vary camber and produce a continuous spanwise twist. In another aspect of the invention, the actuatable structure may be a robotic leg having at least one tendon configured for actuating the leg and the leg may have sufficient flexural degrees of freedom to produce coordinated buckling modes and corresponding elastic energy storage.

In yet another aspect of the invention, an automated process for constructing an actuatable structure includes the steps of assembling a set of discrete units into the structure by connecting a majority of the set of discrete units to each other, each of the discrete units being connected, or adapted to be connected, to at least two other units in the set according to a lattice geometry, and assembling the connected discrete units into the structure according to the lattice geometry, wherein the assembled connected set of discrete units forms the structure and wherein the structure has the property that, in response to at least one type of loading of the structure, a coordinated reversible spatially-distributed deformation of at least part of the structure occurs. The process may be controlled by a specially adapted processor implementing a computer algorithm. The mechanical properties of the structure produced by the process may be tuned by changing the ratio of different types of the discrete units used to assemble the structure, the shape of the different types of the discrete units used to assemble the structure, the mechanical properties of the different types of the discrete units used to assemble the structure, and/or the lattice geometry of the structure.

BRIEF DESCRIPTION OF THE DRAWINGS

Other aspects, advantages and novel features of the invention will become more apparent from the following detailed description of the invention when considered in conjunction with the accompanying drawings wherein:

FIGS. 1A-D depict the construction of an exemplary digital material airplane wing section prototype having variable aerodynamic modes, according to one aspect of the present invention;

FIGS. 10, 11A-B, 12A-B, and 13 are design drawings for a digital material leg, such as the leg of FIG. 9; wherein:

FIG. 10 depicts the exemplary part set for the digital material leg;

FIGS. 11A-B depict exemplary design drawings for constructions for the digital material leg using the parts of FIG. 11A-B;

FIGS. 12A-B are 3D design renderings of parts of the lattice structure of the digital material leg; and FIG. 13 is a 3D design drawing of a complete set of the legs;

FIGS. 16, 17A-F, and 18A-B depict various experiments and simulations performed to measure and model flexural digital material part behavior, in order to build a hierarchical finite element model; and FIGS. 19 and 20 depict hierarchical simulations of exemplary constructions using flexural digital materials.

DETAILED DESCRIPTION

Figure 2:
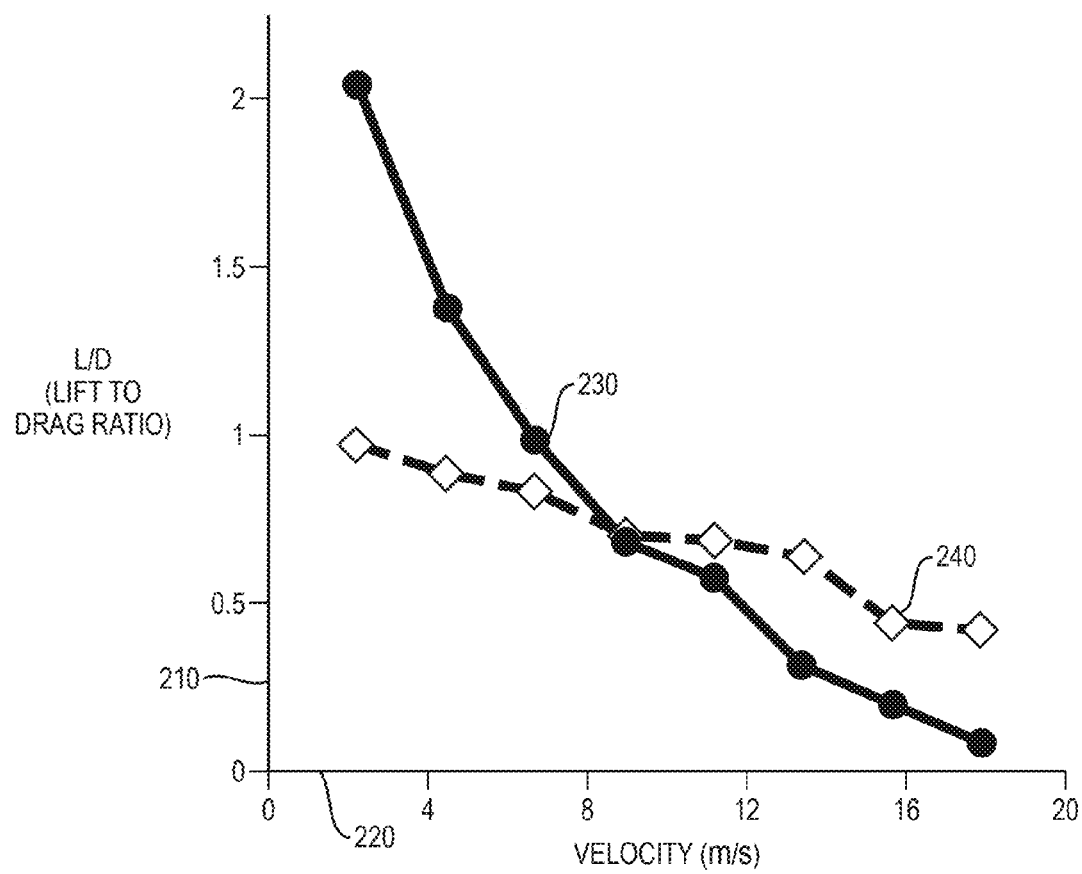
FIG. 2 is a graph of lift to drag ratio (L/D) vs. velocity for the prototype of FIG. 1D.

In one aspect of the invention, digital composites are used to implement actuators exhibiting spatially distributed deformation, with actuator mass separated from moving regions, and capable of exotic, programmable movements. Bulk digital composites have been fully described and implemented in U.S. patent application Ser. No. 13/961,880, filed Aug. 7, 2013, of which this application is a continuation-in-part and which is herein incorporated by reference in its entirety, and in Cheung, K. C., "Digital Cellular Solids: Reconfigurable Composite Materials", Ph.D. Thesis, Massachusetts Institute of Technology, 2012, and Cheung, K. C., Gershenfeld, N., "Reversibly Assembled Cellular Composite Materials", Science vol. 22, May 2013, which are also herein incorporated by reference in their entirety.

U.S. patent application Ser. No. 13/961,880 and Cheung and Gershenfeld (2013) show that bulk digital composites lie in a regime of density and stiffness far outside the parameter space of conventional materials. Further, materials assembled this way are useful as deformable, actuatable structures. Flexural degrees of freedom can be placed into the discrete lattice to induce a desired global behavior in response to specific loads and driving forces. The same part set can be assembled in multiple ways to produce different bulk responses to the same external load. While these lattices can exhibit the high stiffness of a tension-dominated structure under some assembly conditions, flexural degrees of freedom can be placed to encourage desired coordinated buckling modes and the corresponding elastic energy storage.

The present invention demonstrates the applicability of a digital material approach in designing new methods for assembly of structures with static reconfigurability. As a digital material system, digital flexural materials are kits-of-parts with few primitive part types that can produce functionally useful assemblies, which have life cycle efficiencies exceeding that of conventional engineered fabrication methods. Digital materials allow for the design of materials with many small and inexpensive flexures that combine to deliver large displacements with large forces, and/or tunable elastic phases in a lattice geometry that allows for deformation with simple large scale actuation without compromising the strength of the assembly.

In many applications, this type of actuation holds advantages over conventional actuation. First, the deformation is spatially distributed, resulting in actuation without discontinuities. This holds particular promise for the design of aerodynamic control surfaces. Second, for high-speed applications, this class of actuators has low moving mass. One application is fast-moving robotic legs where all motor mass is confined to a stationary hip and motion is transmitted along two digital material actuators in series using tendons and cable housing.

An exemplary application of the invention is aerodynamic devices, such as aircraft wings. Variable geometry mechanisms have been employed in many fields including structural and vehicle (sea, air, or land) design. The purpose is often to adapt to varying environmental physical conditions, and the devices themselves are typically active and have been implemented with extrinsic control and actuation. Digital materials allow for structures with similar changes in geometry by design, but which occur as continuous deformations and, possibly, as passive responses to changes in environmental condition. Current control and actuation systems are extrinsic to the primary aircraft structure. A wing having a digital flexural material structure can be tuned to passively elastically deform to desired shapes as a response to changes in load, load distribution, or pressure that results from changes in airspeed, while maintaining structural integrity.

Figure 3:
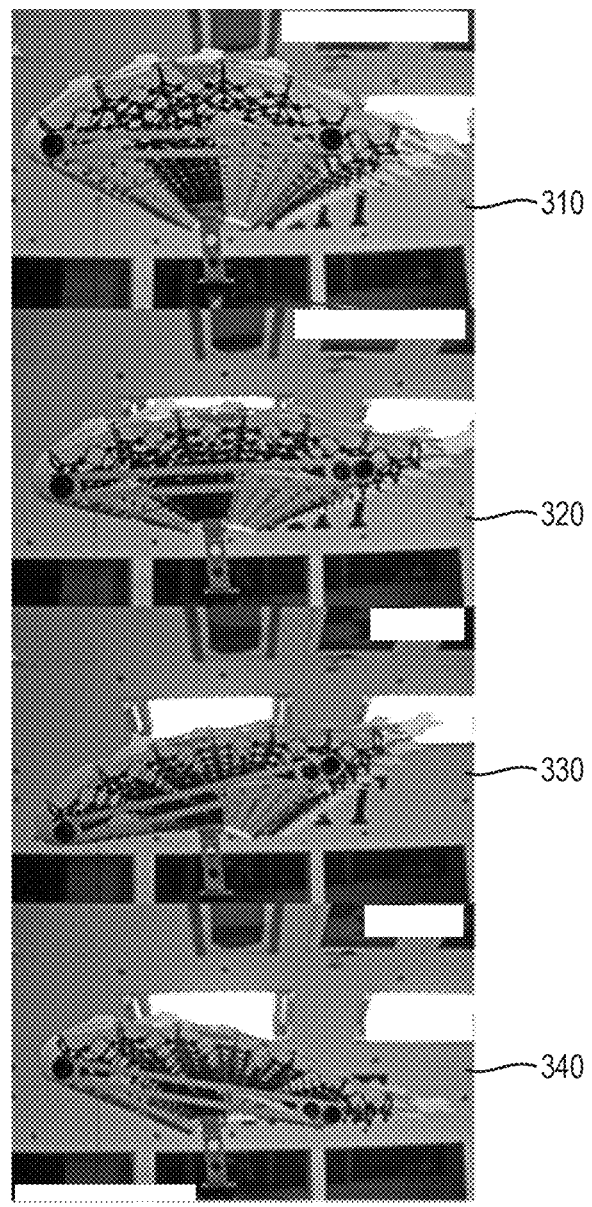
FIG. 3 depicts differential deformation of the prototype of FIG. 1D under experimental conditions.
Figure 4A:
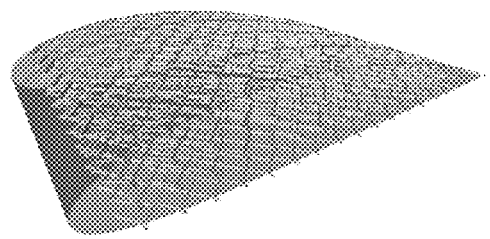
FIGS. 4A-D depict an example of filling an arbitrary wing section profile with unique digital material piece types.
Figure 4B:
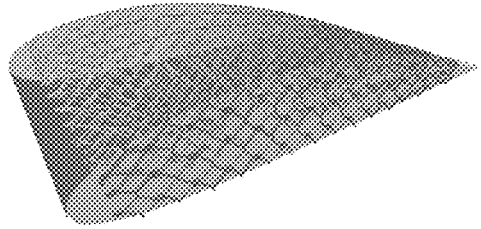
Figure 4C:
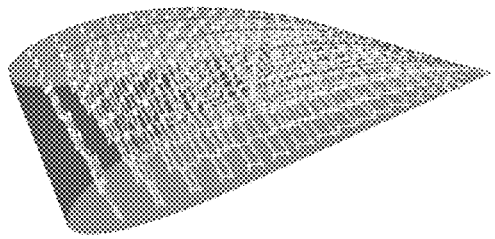
Figure 4D:
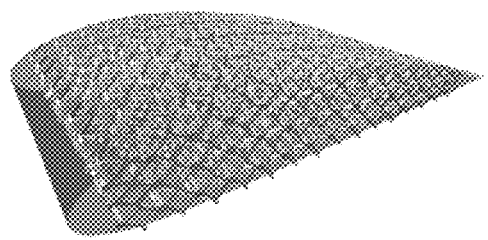

FIGS. 1A-D depict the construction of an exemplary digital material airplane wing section prototype having variable aerodynamic modes. This prototype digital material wing has the flexural degrees of freedom to vary camber and produce a continuous spanwise twist. These modes are fundamental to aerodynamic control and avoid efficiency losses from discontinuous control surfaces. Shown in FIG. 1A are exemplary parts 105 and basic unit shape 110 constructed from parts 105. FIGS. 1B and 1C are two views of a portion of the airplane wing internal lattice construction from parts 105 and basic unit shapes 110. FIG. 1D depicts the completed airplane wing section prototype 140. FIG. 2 is a graph of lift to drag ratio (L/D) 210 vs velocity 220 for the prototype of FIG. 1D under high camber 230 and low camber 240 conditions. FIG. 3 depicts differential deformation of the prototype of FIG. 1D under experimental conditions. Depicted in FIG. 3 are high camber 310, low camber 320, roll (−) 330, and roll (+) 340.

These lattice materials can be made to follow a precisely described surface (such as those used in aeronautics) by specifically designing individual parts to follow a specified path. FIGS. 4A-D depict an example of filling an arbitrary NACA (National Advisory Committee for Aeronautics) wing section profile with unique piece types.

Figure 5:
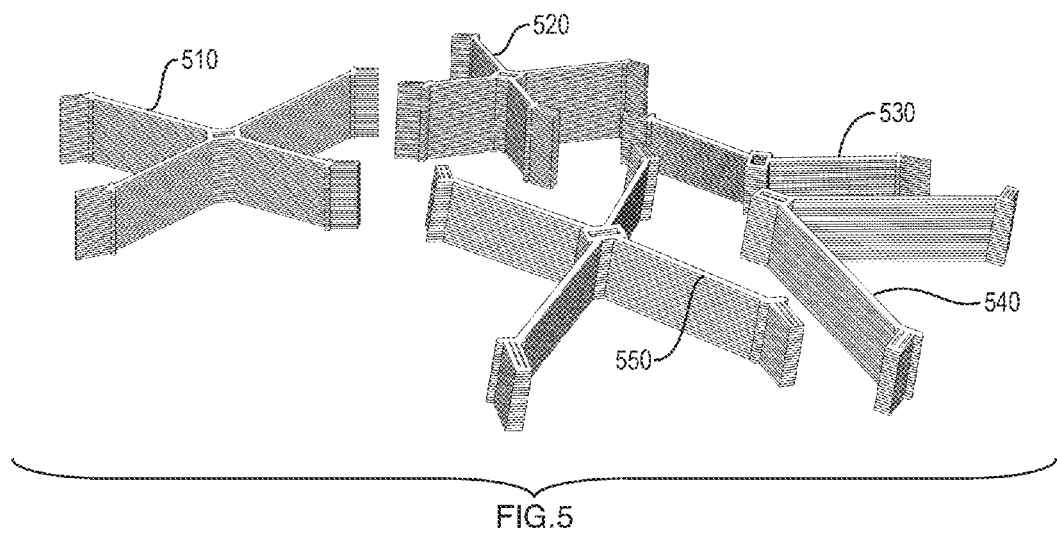
FIG. 5 depicts stacks of exemplary different piece types suitable for use in constructing an item having a cylindrical geometry.

Using this system, even items with highly complex geometries, such as cylindrical, can be constructed. FIG. 5 depicts stacks of five different exemplary piece types 510, 520, 530, 540, 550 suitable for use in constructing an item having a cylindrical geometry.

Figure 6:
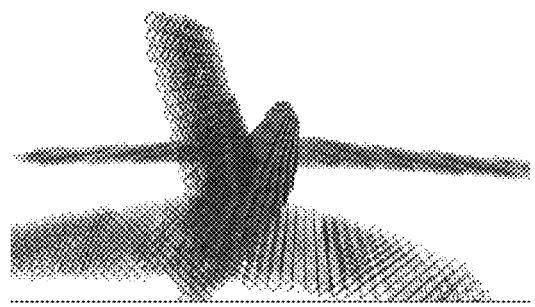
FIG. 6 depicts an exemplary airplane filled with identical digital material pieces.
Figure 7:
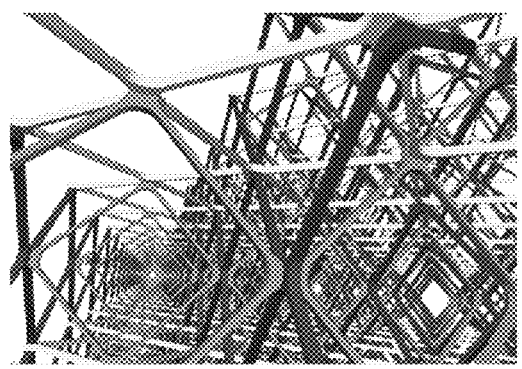
FIG. 7 is a close up view of one segment of the lattice construct of the airplane of FIG. 6.

Complex geometries with less precisely specified contours can be filled with uniform pieces, lowering the complexity of robotic assembly. FIG. 6 depicts an exemplary airplane filled with identical digital material pieces, while FIG. 7 is a close up view of one segment of the airplane construction.

Figures 8A, 8B, 8C:
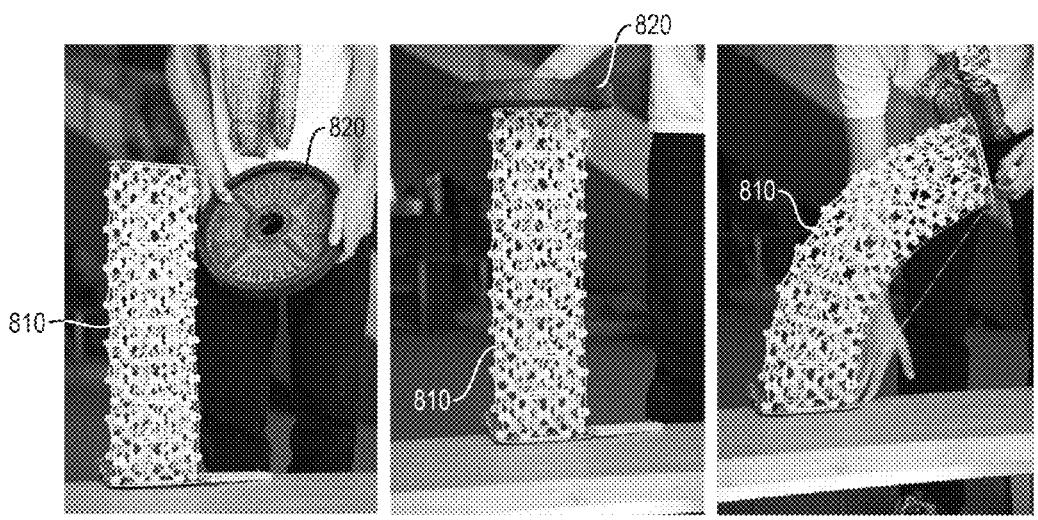
FIGS. 8A-C depict an exemplary flexural digital material leg that exhibits large strain in one direction while maintaining lengthwise and off-axis stiffness.

Structures according to the invention are also applicable to robotics. FIGS. 8A-C depict an exemplary flexural digital material leg that exhibits large strain in one direction while maintaining remarkable lengthwise and off-axis stiffness. In FIG. 8A, digital material leg 810 is unloaded. In FIG. 8B, leg 810 shows minimal compression under a 25 lb. weight 820, yet in FIG. 8C it can be seen that leg 810 is capable of flexions in excess of 60 degrees.

Figure 9:
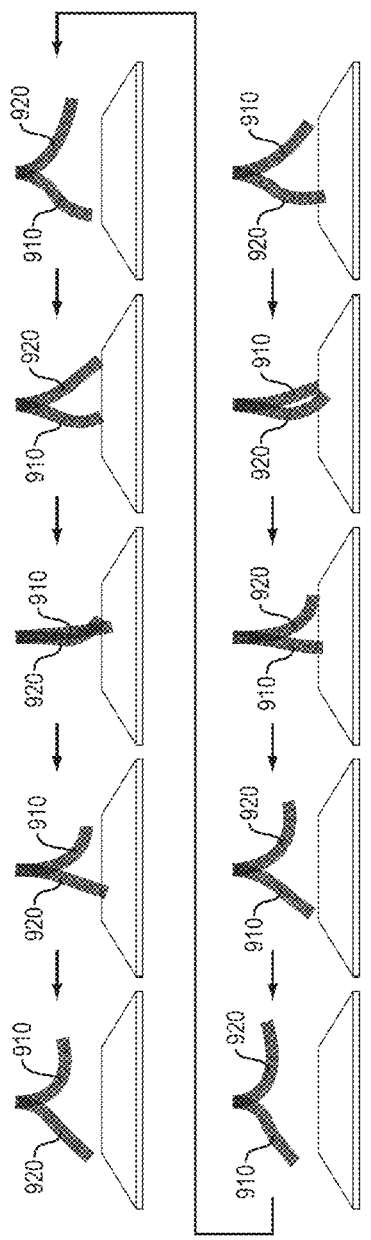
FIG. 9 illustrates the stride sequence of a pair of exemplary robotic digital material legs constructed according to one aspect of the invention.

FIG. 9 illustrates the stride sequence of a pair of exemplary robotic digital material legs 910, 920 constructed according to one aspect of the invention. Legs 910, 920 are actuated using the exemplary basic actuator 810 of FIGS. 8A-C. Each leg 910, 920 uses two such segments to make a double pendulum, capable of making efficient strides. The legs are driven with tendons running through the structure. Such robotic limbs exhibit precisely constrained, complex motion with extremely low moving mass. Due to this, the potential stride rates could be very high. In the embodiment of FIG. 9, each leg has four degrees of freedom, each actuated with a tendon. The first two tendons actuate the hip in the upper leg, while remaining two are communicated through cable housing to the knee in the lower leg.

Figure 10:
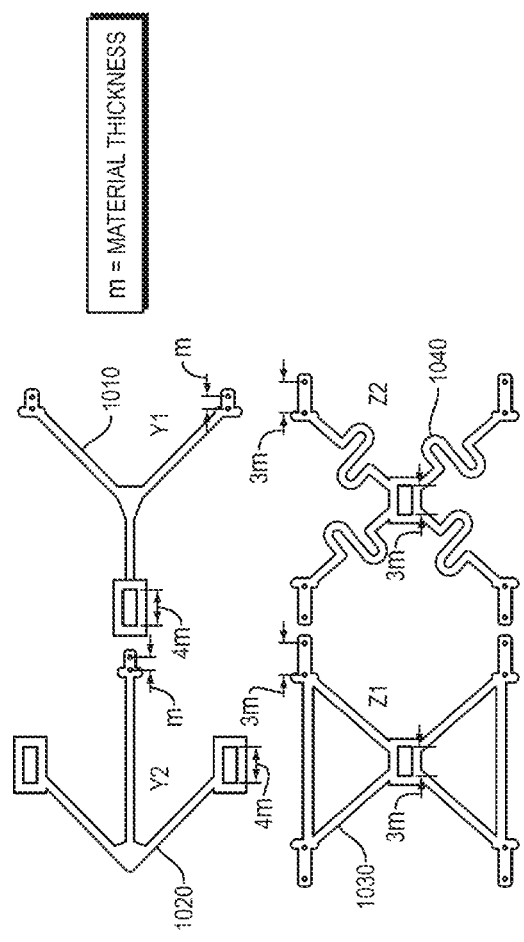
Figure 11A:
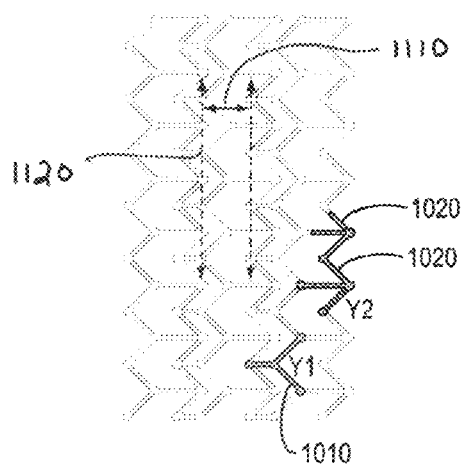
Figure 11B:
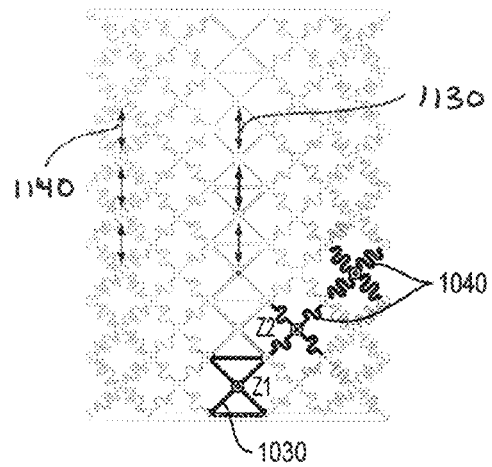
Figure 12A:
Figure 12B:
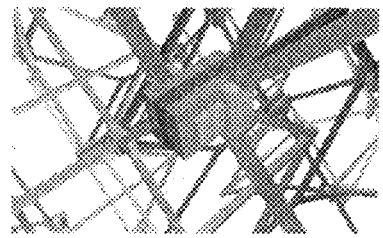
Figure 13:
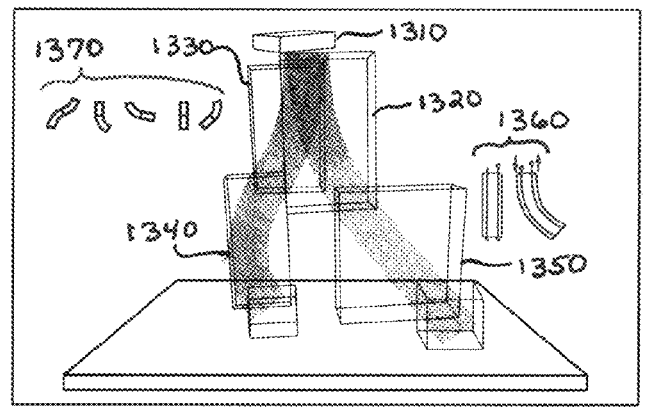

FIGS. 10, 11A-B, 12A-B, and 13 are design drawings for a digital material leg such as the exemplary leg of FIG. 9. FIG. 10 depicts the exemplary part set, having parts 1010, 1020, 1030, 1040. The horizontal distance 1110 between flexures is preserved when the leg is stretched vertically 1120. The central spine 1130 is comprised of parts 1030 and resists compression, while flexures 1040 allow bending 1140. FIGS. 11A-B depict design drawings for constructions using parts 1010, 1020 (FIG. 11A) and parts 1030, 1040 (FIG. 11B). FIGS. 12A-B are 3D design renderings of parts of the lattice structure, and FIG. 13 is a 3D design rendering of the complete set of legs. As FIG. 13 shows, motors 1310 are contained at hips 1320, 1330 (actuation ~sin (t)). With knees 1340, 1350 having actuation ~$\sin^2(t)$, and tendon actuation 1360 as shown, the legs have a double pendulum gait 1370.

Figure 14:
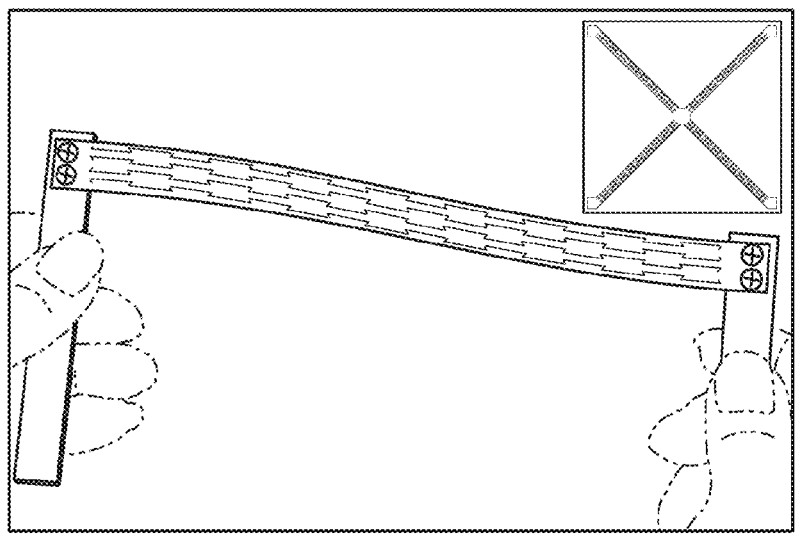
FIG. 14 depicts an exemplary prototype step-function shearing flexure with dovetail keys.
Figure 15A:
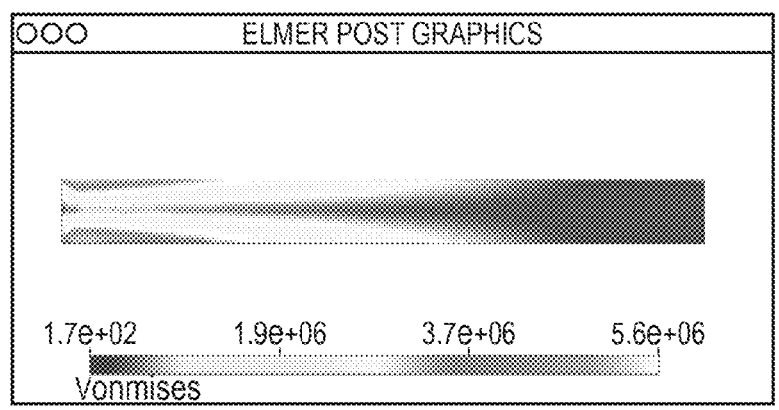
FIGS. 15A-B depict the flexure of FIG. 14 at zero (FIG. 15A) and prescribed (FIG. 15B) strain.
Figure 15B:
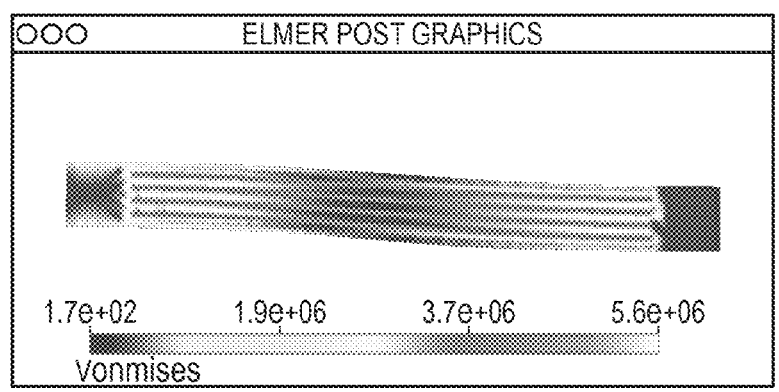
Figure 16:
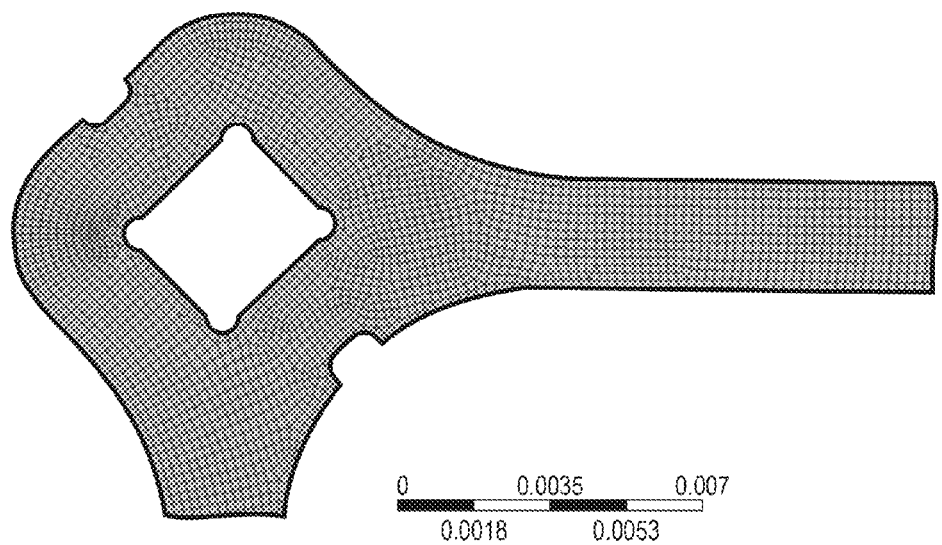
Figure 17A:
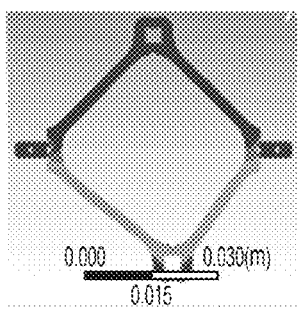
Figure 17B:
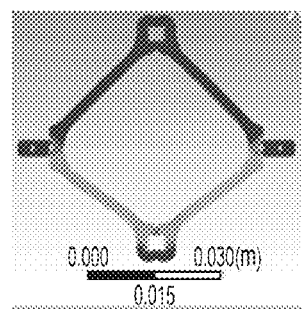
Figure 17C:
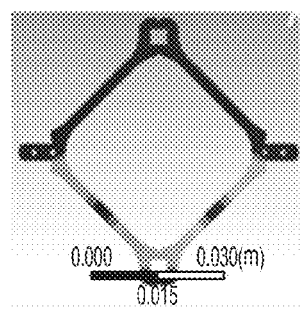
Figure 17D:
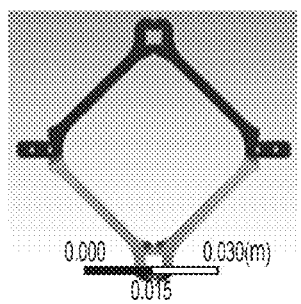
Figure 17E:
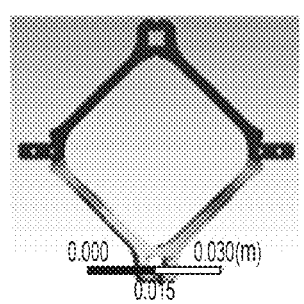
Figure 17F:
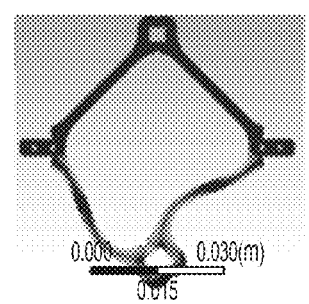

These digital material actuators, such as for the leg of the previous examples, are controlled globally, usually with an internally routed tendon. Like an animal muscle, opposing pairs of these tendons give stiffness to the structure when stressed equally. When differentially stressed, they produce the prescribed deformation. Far from the equilibrium position of the lattice, the integrity of the lattice can be guaranteed by using flexures that lock out at a prescribed strain. FIG. 14 depicts an exemplary prototype step-function shearing flexure with dovetail keys. As shown in FIG. 15A, around zero strain, the whole flexure exhibits behavior characteristic of the five thin strips. At a prescribed strain (FIG. 15B), however, the keys engage and provide the stiffness of nearly the entire plywood member.

Assembling complex shapes through deformation. This technique may also be used to produce complex geometry from the flexed state of a simpler lattice. If done correctly, this can also desirably pre-stress members in the lattice. One interesting use case for this is the construction of vacuum balloons, lightweight, skinned structures from which air can be evacuated without collapse. First order physical analysis suggests a successful vacuum balloon could employ a cylindrical lattice structure, several unit cells thick, with radius on the order of 1-10 meters. This design could be assembled in a flat state with simplified construction techniques and then deformed into the cylindrical configuration.

Predicting performance. When digital material structures are designed with many parts from a small number of piece types, a built-in opportunity to model at the part level occurs. The finite elements become the pieces themselves, allowing verification of the analysis by testing the physical finite elements. The result of modeling and testing parts, is a trusted element stiffness matrix for the digital material piece. For any assembly of these parts, a global stiffness matrix can be aggregated and the resulting system solved. This technique permits production of accurate predictions without meshing entire assemblies on the scale of airplanes. This is a drastic reduction in computational burden and eliminates opportunities for model failures.

FIGS. 16, 17A-F, and 18A-B depict various experiments and simulations performed to measure and model flexural digital material part behavior, in order to build a hierarchical finite element model. FIGS. 19 and 20 depict hierarchical simulations of exemplary constructions using flexural digital materials.

Back-action sensing of flexural digital materials. Discrete assembly of digital material permits programming of a complex deformation mode and actuation of it with a simple global boundary condition, but this also permits sensing of complex deformation modes by including force and torque measurements on the boundary conditions. For instance, the deformable wing shown above could sense lift conditions by including a strain gauge in series with the camber actuator. In this way, deformable digital materials enable a large class of devices to sense interactions with the external environment by monitoring the prescribed deformation modes.

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims.

What is claimed is:

1. An actuatable structure, comprising a set of discrete units, wherein the set of discrete units is assembled into the structure according to a lattice geometry that allows for reversible deformation without compromise of the strength of the structure, wherein a majority of the discrete units are each connected, or are connectible, to at least two other units in the set according to the lattice geometry, and wherein a coordinated reversible spatially-distributed deformation of at least part of the structure occurs in response to changes in load or actuation.

2. The actuatable structure of claim 1, wherein the coordinated reversible spatially-distributed reversible deformation of at least part of the structure is due to at least in part to at least one of: the shape of the units in the set, the material composition of the units in the set, the configuration of connections between the units of the set, and the configuration of the lattice geometry.

3. The actuatable structure of claim 2, wherein the connections are elastic.

4. The actuatable structure of claim 1, wherein the units in the set of discrete units are identical.

5. The actuatable structure of claim 1, wherein the units in the set of discrete units are of at least two types.

6. The actuatable structure of claim 5, wherein at least one of the at least two types of units is a connector unit.

7. The actuatable structure of claim 6, wherein at least one of the at least two types of units differs in material composition or property from at least another of the at least two types of units.

8. The actuatable structure of claim 1, wherein at least some of the discrete units are connected to others of the discrete units by connections that are adapted to transfer force between connected units.

9. The actuatable structure of claim 1, wherein the actuatable structure is a digital material wing and the structure has sufficient flexural degrees of freedom to vary camber and produce a continuous spanwise twist.

10. The actuatable structure of claim 1, wherein the actuatable structure is a robotic leg, the robotic leg further comprising at least one tendon configured for actuating the leg, and wherein the leg has sufficient flexural degrees of freedom to produce coordinated buckling modes and corresponding elastic energy storage.

11. The actuatable structure of claim 1, further comprising step-function flexures configured to protect the integrity of the lattice.

* * * * *